United States Patent [19]

Fatool et al.

[11] Patent Number: 4,962,906
[45] Date of Patent: Oct. 16, 1990

[54] PAINT CAN HOLDER

[76] Inventors: Francis N. Fatool, R.D. #1; Wade Fatool, 946 Reagan St., both of Sunbury, Pa. 17801

[21] Appl. No.: 419,268

[22] Filed: Oct. 10, 1989

[51] Int. Cl.⁵ .............................................. F16M 13/00
[52] U.S. Cl. .................................... 248/148; 248/150; 248/237
[58] Field of Search ............... 248/148, 150, 152, 136, 248/137, 237

[56] References Cited

U.S. PATENT DOCUMENTS

| | | | |
|---|---|---|---|
| 160,418 | 3/1875 | George et al. | 248/136 |
| 548,284 | 10/1895 | Atkinson et al. | 248/136 |
| 682,443 | 9/1901 | Wood | 248/136 |
| 989,104 | 4/1911 | Anderson | 248/148 X |
| 1,306,434 | 6/1919 | Melanson | 248/237 |
| 1,562,484 | 11/1925 | Wright | 248/136 |
| 1,609,207 | 11/1926 | Schlabaugh | 248/136 |
| 1,857,391 | 5/1932 | Nicholls | 248/136 |
| 2,735,641 | 2/1956 | Joecks | 248/210 |
| 3,304,040 | 2/1967 | Lomker | 248/150 X |
| 3,448,956 | 6/1969 | Kuhaneck | 248/210 |
| 4,519,565 | 5/1985 | Whitmore | 248/237 |
| 4,695,023 | 8/1987 | McCafferty | 248/238 |

Primary Examiner—David L. Talbott
Attorney, Agent, or Firm—Thomas Hooker

[57] ABSTRACT

A paint can holder for supporting a paint can on a sloped surface with the can in an upright position independent of the slope of the surface.

4 Claims, 2 Drawing Sheets

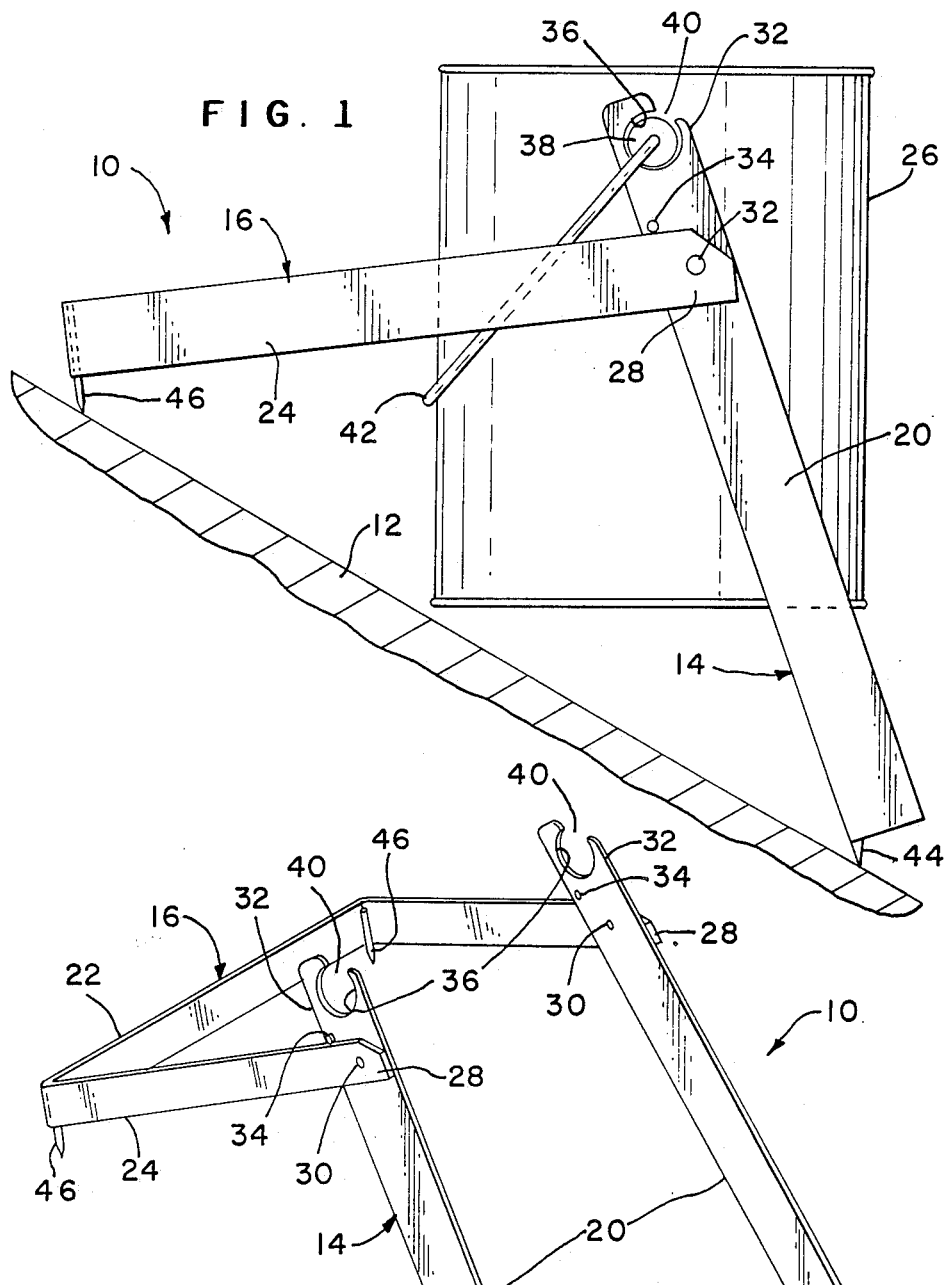

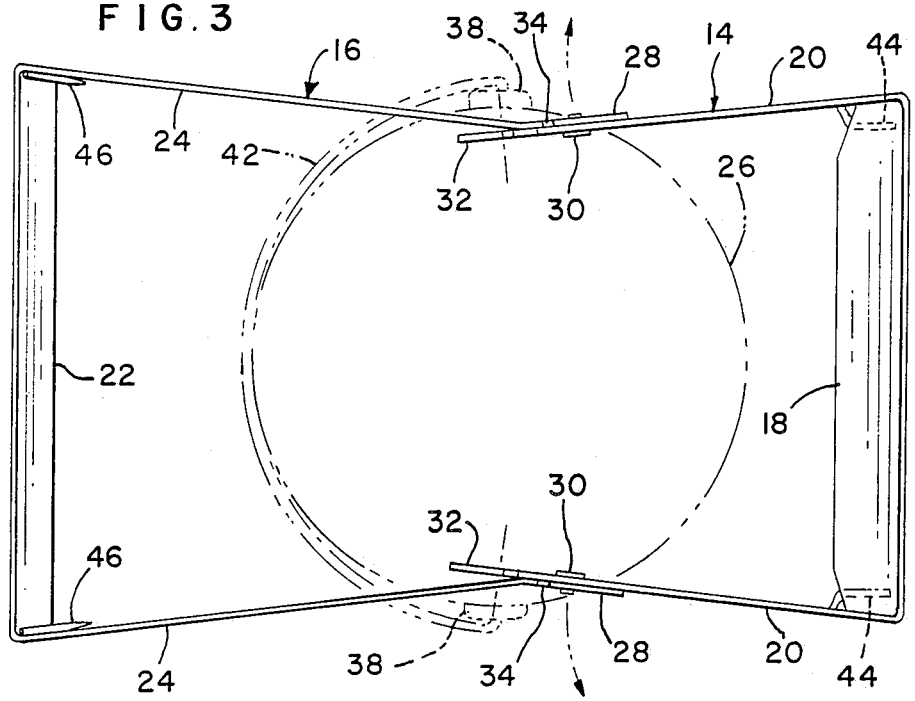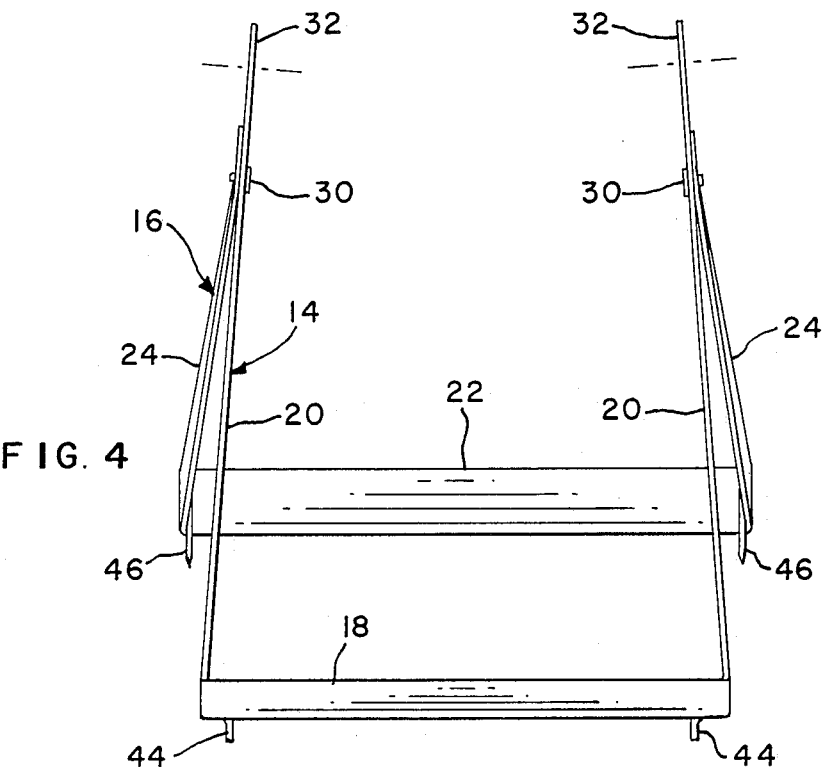

PAINT CAN HOLDER

BRIEF DESCRIPTION OF THE PRIOR ART

Conventional paint can holders hold cans on sloping roofs or sloping ladders. Ladder attachment holders limit use of the ladder and without spilling the paint. A can holder for tin roofs is permanently attached to the can and uses magnetic feet.

1. Field of the Invention

The invention relates to can holders, particularly holders for supporting paint cans on sloping surfaces in an upright position.

2. Summary of the Invention

The invention is a two-piece paint can holder having a pair of U-shaped frame members with legs hinged together at their free ends. Stops limit opening of members about the hinge connections. The legs of one member extend beyond the hinge connections and include holes which are fitted around handle bosses on a paint can to secure the paint can to the holder. The holder and can may be placed on a roof with the member supporting the can extending downroof and the other member extending uproof. Suitable spikes or feet are provided on the bases of the members to engage the roof and prevent sliding of the holder and can down the roof.

Gravity holds the can in an upright position with the top open and unobstructed for easy access by the painter. When not used, the two members are hinged together to a closed storage position.

Other objects and features of the invention will become apparent as the description proceeds, especially when taken in conjunction with the accompanying drawings illustrating the invention, of which there are three sheets and one embodiment.

BRIEF DESCRIPTION OF THE DRAWINGS

FIG. 1 is a side view of the paint can holder supporting a can on a sloping roof.

FIG. 2 is an isometric view of the holder of FIG. 1 in its open position without the paint can.

FIG. 3 is a top view of the paint can holder of FIG. 2.

FIG. 4 is an end view of the paint can holder of FIG. 2.

DESCRIPTION OF THE PREFERRED EMBODIMENT

FIG. 1 shows paint can holder 10 supporting a one gallon paint can on sloping roof 12. The holder includes a pair of U-shaped frame members 14 and 16 each formed from lengths of flat metal strip stock and joined together to form a collapsible frame. Frame member 14 includes a base 18 and a pair of legs 20 extending in the same direction from opposite ends of the base. Member 16 includes a base 22 and legs 24 extending in the same direction away from the base. The legs of each frame member extend inwardly toward each other at a shallow angle and are elastically bent outwardly to a generally parallel configuration when holder supports paint can 26.

The free ends 28 of legs 24 are bent outwardly and overlie the outer surfaces of legs 20 a short distance inwardly from the ends of the legs. Pins 34 form hinged connections between ends 28 and legs 20 and permit relative pivotal movement of the two frame members 14 and 16 between a collapsed position (not illustrated) and an open position as shown in the drawings. The free ends 32 of legs 20 carry stop pins 34 located outwardly of hinge pins 30. With frame members spread to the full open position the ends of legs 24 engage pins 34 so that the holder, when positioned on roof 12 as shown in FIG. 1, is rigid.

Circular openings 36 are formed through the thickness of ends 32 outwardly of pins 34 and are adapted to fit around the handle bosses 38 on can 26. The circular openings are slightly larger than the bosses. Slots 40 in openings 36 permit movement of the ends of can handle 42 into the openings and positioning of the ends 32 over the bosses.

Shingle engaging spikes 44 and 46 are attached to the outer ends of the member bases 18 and 22 as illustrated. Spikes 44 extend below base 18 in a direction generally parallel to the plane of frame member 14. Spikes 46 are below base 22 when the holder is open. With the open holder 10 in position on roof 12 as shown in FIG. 1 supporting can 26 the weight of the can biases the spikes against the roof, commonly asphalt shingles, and secure the holder and can in place.

When not used, paint can holder 10 is folded to the collapsed position with the two bases 18 and 22 adjacent each other so that the holder occupies minimum space for storage. The collapsed holder is easily mounted on can 26 by holding the free ends of the legs 20 and 24 and spreading the legs open while moving slots 40 over the ends of can handle 42 and then releasing the legs so that they move toward each other and position openings 36 over bosses 38. When the holder is free of can 26 ends 32 are located closer together than the spacing between the bosses 38, as shown in FIG. 3. When the holder is fitted on can 26, the resiliency of the frame members holds ends 32 against the sides of the can thereby preventing unintentional disengagement of the can from the holder.

Once the can has been mounted on the holder the two members are pivoted apart to the locked open position of FIG. 1 where ends 28 engage pins 34. The holder and can may be placed on roof 12 with member 14 extending downroof and member 16 extending uproof, as illustrated. Spikes 44 and 46 bite into the roof to assure that the holder and can stay in place during painting. Other feet may be attached to the bases in place of spikes 44 and 46 to facilitate use of the holder on tin or other roofs.

Openings 36 are located above pins 34 thereby assuring that the weight of the can is exerted on the pins to maintain the holder in the open position.

The can freely rotates in openings 36 and maintains an upright position to facilitate painting, independent of the slope of the roof. The weight of the can holds the members to an open position and maintains engagement with the roof. When it is desired to move the can and holder to a different location on the roof the painter simply picks up handle 42 and lifts the can and holder from the roof. The can holder is repositioned on the roof by opening the to members 14 and 16 and then lowering the holder back onto the roof.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention is:

1. A collapsible holder for supporting a can having bosses extending outwardly from upward sides of the can and a handle attached to the bosses on a sloping surface, the holder comprising:
   a. first and second U-shaped members each formed from a metal strip and having a base and a pair of generally parallel legs extending away form the ends of the base to free ends with the ends of the members overlying each other;
   b. pin hinge connections joining the overlying ends of the members together and permitting pivotal movement of the members between an open position in which the bases are apart and a closed position in which the bases are together, the free ends of the first member extending outwardly beyond the hinge connections;
   c. stop means on the legs of the members near one hinge connection for limiting opening of the members, the stop means including a stop projection on one of said first and second members extending above the side of such member and located in the path of movement of the other of said first and second members toward the open position, such projection being engagable with an edge of such other member when the members are rotated about the hinge connections to the open position;
   d. can support means on the free ends of said first member for removable surrounding engagement with the bosses on the side of a can positioned between such free ends, the can support means including opposed generally circular openings formed through such free ends and slots narrower than the openings extending through such free ends to the openings; said members being resiliently outwardly deformable to permit movement of the free ends over bosses on a can and the slots over a handle extending from the bosses and, upon release of the members, movement of the circular openings onto the bosses; and
   e. surface engaging spikes on the base of the first member and extending below the base of said first member for securing the holder and supported can in place on a sloping surface.

2. A holder as in claim 1 including spikes on the second member and extending below the base of the second member for engaging a sloping surface.

3. A holder as in claim 1 wherein the legs of said members are bent inwardly toward each other at a shallow angle, said members forming springs for resiliently biasing the can support means against the sides of a can.

4. A holder as in claim 1 in which said stop projection is carried by said first member and engages an edge of said second member when the holder is in the open position.

* * * * *